Figure 1:
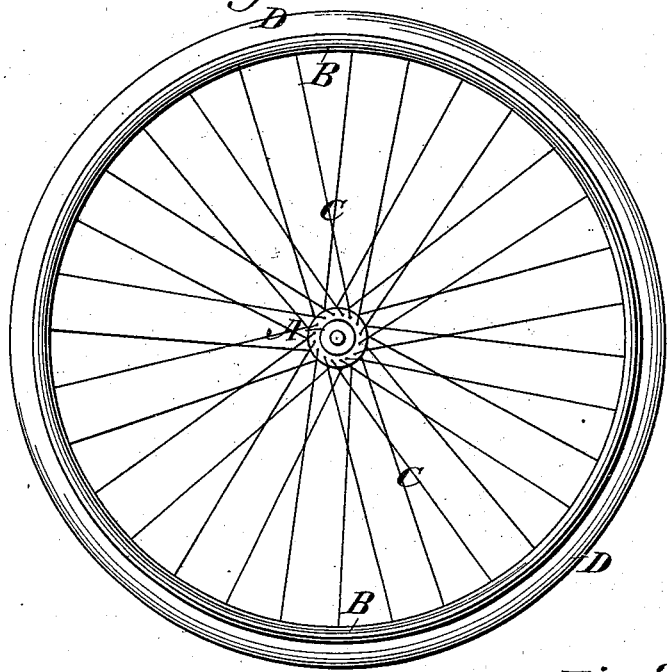

(No Model.) 2 Sheets—Sheet 1.
E. S. RENWICK.
CARRIAGE WHEEL.

No. 531,447. Patented Dec. 25, 1894.

Witnesses:—
O. H. Haynood
Jas. E. Warner

Inventor:—
Edward Sabine Renwick (No Model.) 2 Sheets—Sheet 2.

E. S. RENWICK.
CARRIAGE WHEEL.

No. 531,447. Patented Dec. 25, 1894.

Witnesses:
D. H. Haywood
Jas. E. Warner

Inventor:-
Edward Sabine Renwick

UNITED STATES PATENT OFFICE.

EDWARD SABINE RENWICK, OF MILLBURN, NEW JERSEY.

CARRIAGE-WHEEL.

SPECIFICATION forming part of Letters Patent No. 531,447, dated December 25, 1894.

Application filed January 31, 1894. Serial No. 498,558. (No model.)

*To all whom it may concern:*

Be it known that I, EDWARD SABINE RENWICK, of Millburn, in the county of Essex and State of New Jersey, have made an invention of certain new and useful Improvements in Wheels for Wheel-Carriages, such as Bicycles, Sulkies, &c.; and I do hereby declare that the following, in connection with the accompanying drawings, is a full, clear, and exact description and specification of the same.

The object of this invention is to furnish a carriage wheel with an elastic tire.

Previous to this invention, such wheels have been made with elastic tires of solid rubber. They have also been made with flexible tubular tires distended with air under high pressure. They have also been made with what are known as cushion tires, consisting of tubes of rubber and canvas sufficiently thick to be stiff enough to stand the pressure upon them; and they have been made with tires of cork or of cork and india rubber inclosed in a covering of canvas. It has also been proposed to make such tires of cork combined with a resilient substance such as the compound of gelatine and glycerine or sponge rubber. These kinds of elastic tire are objectionable; the first kind, because if the tire be made of sufficient cross area to present the requisite elasticity, its weight and its cost are both great. The second kind of tire, or pneumatic tire, as it is commonly called, is objectionable because of the leakage of air and the consequent necessity of occasionally injecting an additional quantity into it, and also because the tire is apt to be punctured in use, so as to permit the air to escape, whereupon the tire collapses. The cushion tires are comparatively heavy when made with sufficient material to withstand the pressure upon them and the wear; and the cork tires, which have hitherto been made, are defective because the cork when dry is deficient in resiliency and is liable to crumble in use; and although it has been proposed to steam the cork, this operation does not remedy the defect because the water incident to the condensation of steam, rapidly dries out, and the cork tire speedily becomes the same as if made originally of dry cork with its inherent defects. On the other hand tires made of cork combined with a resilient material such as the compound of gelatine and glycerine or sponge rubber, owe their elasticity mainly to such resilient material, as the cork being dry has the defects previously mentioned.

The invention which constitutes the subject of this patent consists in part of a carriage wheel having its body fitted with a tire of permanently moist cork, and it consists further of the permanently moist cork tire and tire-core adapted to be fitted to a carriage wheel body.

The improvements which constitute the several parts of the invention are specified in the claims at the close of this specification.

In order that they may be fully understood, I have represented in the accompanying drawings, and will proceed to describe, a wheel for a bicycle embodying the said invention, it being understood that the construction of the wheel may be modified (without ceasing to embody the invention), as evidenced by sundry modifications which I shall also describe.

Figure 2:
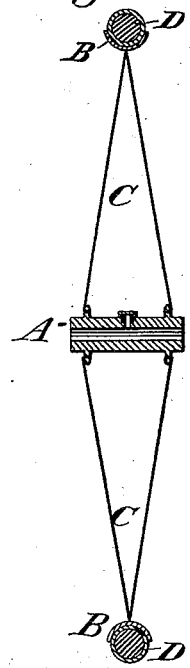
Figure 4:
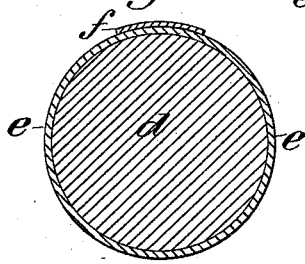
Figure 3:
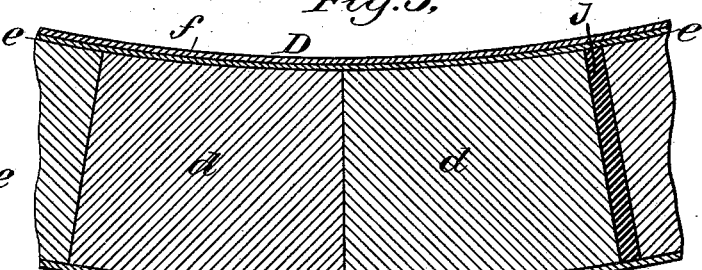

In the said drawings, Figure 1, represents a side view of the bicycle wheel embodying the invention. Fig. 2, represents a vertical transverse section of the same. Fig. 3, represents a central vertical section of a part of the permanently moist cork tire of the wheel upon a larger scale than the preceding figures. Fig. 4, represents a transverse section of the said tire. Figs. 5, 6, 7, 8, 9, and 10, represent severally, as hereinafter described, sections of modifications of the permanently moist cork tire.

The bicyle wheel represented in the accompanying drawings has a body composed of the hub, A, a gutter-formed rim or felly, B, and the spokes, C; and I prefer to construct it as a suspension wheel with wire spokes, C, connecting the hub and the rim or felly, B. I prefer also to construct the hub with ball bearings, or other friction-reducing bearings, but as such bearings are well known and in common use, it is not deemed necessary to describe them in detail or to represent them in the drawings.

The cork tire, D, is made of permanently moist cork, that is, of the material commonly called cork, of which bottle corks are made, which has been impregnated with a non-drying liquid or equivalent substance. This tire may be constructed in various ways: Thus, the cork tire may be composed, as represented in Figs. 3 and 4, of cylindrical sections, $d, d, d$, connected together so as to form a continuous tire or hoop for the wheel. The mode in which I prefer to connect the cork sections is represented in those figures, and consists of a sheath or hoop-formed tubular cover or envelope, $e$, of canvas or other cloth, cemented together with india rubber and vulcanized, the cover being made substantially like ordinary rubber hose for conveying liquids, and circular or hoop-formed, to suit the circumference of the felly of the wheel.

In constructing the tire, the circular tubular sheath may be first made of the requisite diameter for use; then it may be slit open longitudinally at its inner side and cork sections inserted in it. Subsequently the slit may be closed by cementing upon it a strip, $f$, of canvas or other cloth, by means of rubber cement.

Figure 6:
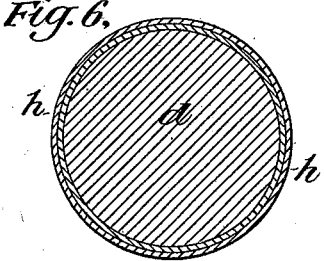
Figure 5:

The cover may consist of a single layer of canvas coated with india rubber, strengthened, if desired, at the exterior which runs upon the ground, by an additional longitudinal strip cemented to the cover in like manner; or, the circular cover may be secured upon the cork sections or core, as represented in Fig. 5, by wrapping spirally upon it a tape or strip of cloth or of india rubber, $g$, secured with rubber cement; or the cover or envelope itself may be made of india rubber without cloth, as represented at $h$, Fig. 6. The tire when constructed is applied in the usual way to the gutter formed rim or felly of the wheel as represented at D, Figs. 1 and 2, and may preferably be cemented at its inner periphery to the felly.

Figure 7:
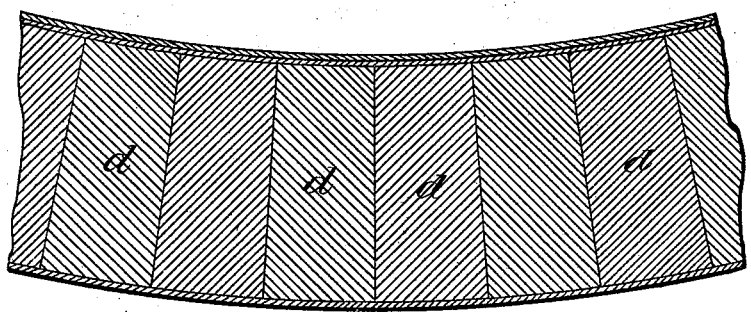
Figure 8:
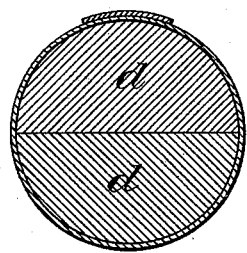
Figure 9:
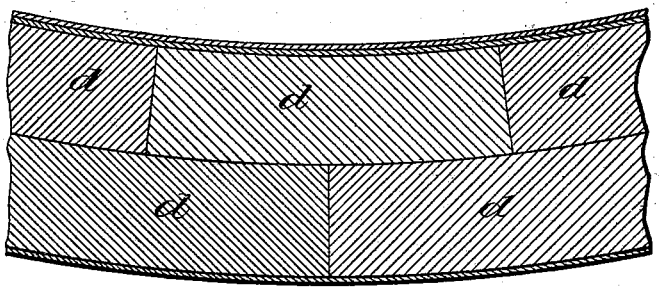

Instead of constructing the cork tire as represented in Figs. 2 and 3, of cylindrical sections of considerable length relatively to their diameter, it may be constructed of a series of circular disks of cork similar to what are known as flat corks as represented at Fig. 7, the said disks being inclosed and connected by a hoop-formed tubular envelope or cover as previously described; or the cork core may be composed of cork sections intercalated with india rubber as represented at $j$, Fig. 3; or the cork core may be composed of two or more layers of cylindrical segments, as represented at Figs. 8 and 9, and in this case I prefer to arrange the segments to break joints with each other as represented in Fig. 9.

If deemed best the cork sections or segments may be sewed together or otherwise connected by twine or by a flexible cement, so as to form them into a core for a tire before inclosing them in a cover. In fact such uncovered tires or tire-cores of cork (treated as hereinafter described) may be made and sold by manufacturers and may be subsequently covered to suit the views of particular users.

Figure 10:
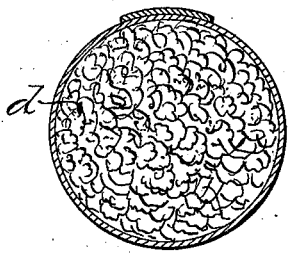

The cork tires thus far described are composed of sections or segments cut from solid cork bark, this being the method of construction which I prefer; but the cork tire may be constructed of cork shavings or cuttings, as at $d$, Fig. 10, compressed into a circular tubular envelope, such as is previously described.

Whatever be the mode in which the tire may be constructed, the cork of which it is composed must, according to my invention, be impregnated with a substance which has the property of rendering it permanently moist in use. The substance which I prefer to employ for this purpose is glycerine, but some substitute or equivalent for glycerine may be used for the purpose of keeping the cork permanently moist in use.

The mode in which I prefer to impregnate the cork with glycerine is to place the cork sections in a vessel and cover them with glycerine, the sections being held down to prevent them from floating by a grating or other suitable device. The whole is then heated, the practical effect of which is to cause the air in the pores of the cork to expand to a greater or less extent, depending upon the temperature. A portion of this expanded air escapes through the glycerine, so that when the whole is permitted to cool, the pressure of the atmosphere forces more or less of the glycerine into the pores of the cork to replace the air expelled; or, the cork sections may be plunged in a bath of hot glycerine, and when heated sufficiently, may be taken from it and plunged in a bath of cold glycerine. The cork sections treated by either mode are impregnated or partially saturated with glycerine, which being a non-drying liquid, keeps them moist for an indefinite period, or permanently moist, thereby enhancing their resiliency and preventing in whole or in part the tendency to crumble or disintegrate by use. As a substitute for glycerine I have used a solution of chloride of calcium in water, in the proportions of one hundred parts by weight of the dry chloride to one hundred and twenty parts of water, this solution being a substance which has the property of keeping the cork permanently moist. I do not, however, recommend this substance as preferable to glycerine, but prefer the latter.

I prefer to squeeze or pound the cork sections previous to connecting them in the wheel tire, the practical effect of such treatment being to render them more supple when the wheels are first used.

If the felly of the wheel be flat instead of gutter formed, the form of the inner circumference of the tire and of its core or body should of course be made flat to suit the felly, to which it is applied.

I claim as my invention—

1. The carriage wheel consisting of the wheel body fitted with a permanently moist tire of cork impregnated with a non-drying substance, substantially as before set forth.

2. The permanently moist hoop-formed cork tire-core for a carriage wheel composed of cork impregnated with a non-drying substance, substantially as before set forth.

3. The permanently moist cork tire for a carriage wheel constructed substantially as before set forth, of cork impregnated with a non-drying substance and inclosed in a tubular cover of hoop form.

In witness whereof I have hereto set my hand this 25th day of January, A. D. 1894.

EDWARD SABINE RENWICK.

Witnesses:
W. L. BENNEM,
JAS. E. WARNER.